United States Patent
Dragicevic et al.

(10) Patent No.: US 8,413,122 B2
(45) Date of Patent: Apr. 2, 2013

(54) SYSTEM AND METHOD FOR DEMONSTRATING THE CORRECTNESS OF AN EXECUTION TRACE IN CONCURRENT PROCESSING ENVIRONMENTS

(75) Inventors: Kristijan Dragicevic, Zurich (CH); Luis Garces-Erice, Zurich (CH); Daniel Nikolaus Bauer, Birmensdorf (CH)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/370,048

(22) Filed: Feb. 12, 2009

(65) Prior Publication Data

US 2010/0205484 A1    Aug. 12, 2010

(51) Int. Cl.
*G06F 9/44* (2006.01)
(52) U.S. Cl. ......... 717/128; 717/126; 717/127; 717/131
(58) Field of Classification Search ........................ None
See application file for complete search history.

(56) References Cited

U.S. PATENT DOCUMENTS

| | | | |
|---|---|---|---|
| 6,510,531 B1 * | 1/2003 | Gibbons .......................... 714/37 |
| 7,131,113 B2 * | 10/2006 | Chang et al. ................... 717/128 |
| 7,178,134 B2 * | 2/2007 | Groeschel ...................... 717/128 |
| 7,181,461 B2 * | 2/2007 | Bonner et al. ................. 717/127 |
| 7,559,053 B2 * | 7/2009 | Krassovsky et al. .......... 717/126 |
| 8,230,398 B2 * | 7/2012 | Frohlich et al. ................ 717/127 |
| 8,234,631 B2 * | 7/2012 | Greifeneder et al. ......... 717/128 |
| 8,276,126 B2 * | 9/2012 | Farnham et al. .............. 717/131 |
| 2006/0156157 A1 | 7/2006 | Haselden et al. |
| 2007/0168993 A1 * | 7/2007 | Gopal et al. ................... 717/128 |
| 2009/0044174 A1 * | 2/2009 | Dolby et al. ................... 717/127 |
| 2009/0113398 A1 * | 4/2009 | Birkill et al. .................. 717/128 |
| 2010/0257511 A1 * | 10/2010 | Hatabu ........................... 717/131 |

OTHER PUBLICATIONS

Cao et al., Faithful Reconstruction of Application Behavior Based on Event Traces in the LiteOS Operating System, Apr. 2008, 2 pages, <http://delivery.acm.org/10.1145/1380000/1372699/3157a549.pdf>.*
Breu et al., Aspect Mining Using Event Traces, Sep. 2004, 6 pages, <http://delivery.acm.org/10.1145/1030000/1025235/21310310.pdf>.*
Roth et al., Multi-object tracking driven event detection for evaluation, Oct. 2008, 8 pages, <http://delivery.acm.org/10.1145/1470000/1463546/p17-roth.pdf>.*
Vafeiadis, Shape-value Abstraction for Verifying Linearizability, VMCIA 2009.
Fraser, Practical lock-freedom, Technical Report, University of Cambridge, 2004.
Herlihy, et al. "Linearizability: A Correctness Condition for Concurrent Objects", ACM Transactions on Programming Languages and Systems, 12(3):463-492 (1990).
Chinese Office Action issued in Chinese Patent Application No. 201010116123.3, mailed Oct. 10, 2012.

* cited by examiner

*Primary Examiner* — Thuy Dao
(74) *Attorney, Agent, or Firm* — Scully, Scott, Murphy & Presser, P.C.; Gail H. Zarick, Esq.

(57) ABSTRACT

Since multi-core processors have become the standard architecture for general purpose machines, programmers are required to write software optimized for parallelism. Verification of correctness is an important issue for parallel code because of its complexity. There are still tools missing that provide verification for complex code, such as testing the execution of code provides. Consequently, described herein are systems and methods to evaluate the correctness of program traces. Furthermore, the systems and methods described herein do not demand excessive computational requirements and the size of the program trace being evaluated increases.

24 Claims, 9 Drawing Sheets

| Time | Event | Value | Log entry id |
|------|-------|-------|--------------|
| 0 | Remove start | Null | 0 |
| 1 | Insert start | 5 | 1 |
| 2 | Remove end | Null | 0 |
| 3 | Insert start | 4 | 2 |
| 4 | Remove start | 4 | 3 |
| 5 | Insert end | 5 | 1 |
| 6 | Remove end | 4 | 3 |
| 7 | Insert end | 4 | 2 |

FIG. 1
| Log entry id | Operation type | Start time | End time | Value |
|---|---|---|---|---|
| 0 | Remove | 0 | 2 | Null |
| 1 | Insert | 1 | 5 | 5 |
| 2 | Insert | 3 | 7 | 4 |
| 3 | Remove | 4 | 6 | 4 |
FIG. 2
| Time | Event | Value | Log entry id |
|---|---|---|---|
| 0 | Remove start | Null | 0 |
| 1 | Insert start | 5 | 1 |
| 2 | Remove end | Null | 0 |
| 3 | Insert start | 4 | 2 |
| 4 | Remove start | 4 | 3 |
| 5 | Insert end | 5 | 1 |
| 6 | Remove end | 4 | 3 |
| 7 | Insert end | 4 | 2 |
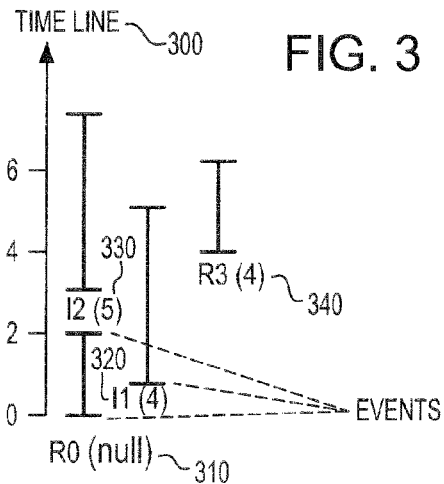
FIG. 3
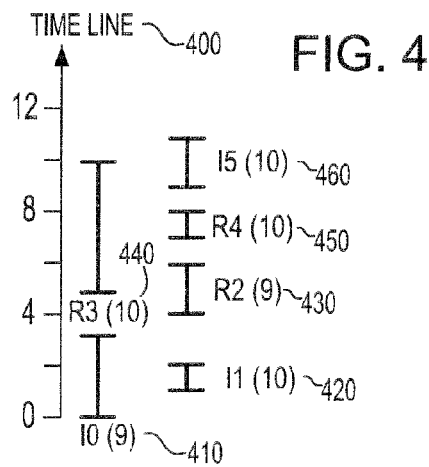
FIG. 4

| NAME OF COLLECTION | DESCRIPTION |
|---|---|
| ASSOCIATED REMOVALS | CONTAINS PAIRS OF "REMOVES" AND "INSERTS" THAT WERE ASSOCIATED |
| PENDING REMOVALS | CONTAINS LOG ENTRIES OF "REMOVE" OPERATIONS THAT WERE NOT ASSIGNED AND NOT YET COMPLETED |
| PENDING INSERTIONS | CONTAINS LOG ENTRIES OF "INSERT" OPERATIONS THAT WERE NOT ASSIGNED AND NOT YET COMPLETED |
| FINISHED INSERTIONS | CONTAINS LOG ENTRIES OF "INSERT" OPERATIONS THAT WERE NOT ASSIGNED BUT COMPLETED AND WHICH ARE ASSOCIATED WITH ANOTHER "REMOVE" IN AT LEAST ONE OTHER STATE |

FIG. 6

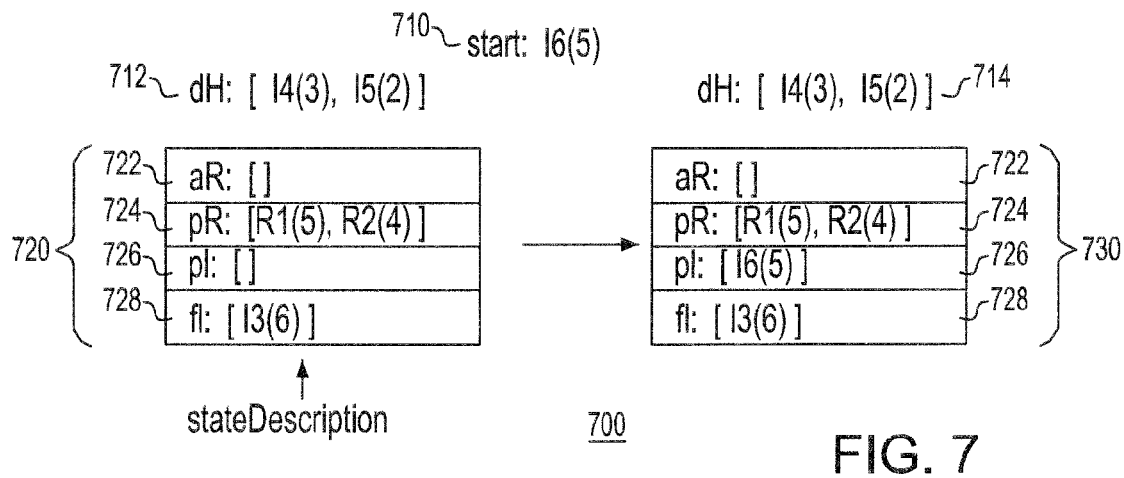

FIG. 7

SYSTEM AND METHOD FOR DEMONSTRATING THE CORRECTNESS OF AN EXECUTION TRACE IN CONCURRENT PROCESSING ENVIRONMENTS

BACKGROUND OF THE INVENTION

The availability of multiple processing units in current computing hardware, introduced by new multi-core processor architectures, provides computing power that cannot be exploited by programs using traditional algorithms and data structures. In previous single-processor architectures, only one thread of execution could be executing at any given time, thus preventing two threads from operating on the same data structure at the same time was relatively easy to avoid data corruption in the data structure, while having a minimal performance impact.

With multi-core processors, however multiple threads may be programmed by computer-executable code (or simply "code") to run concurrently on the different processing units (or "cores"). Preventing their concurrent operation on a data structure is not an efficient way to avoid data corruption, because resources (i.e. cores in the multi-core processor) are wasted if, at most, only one thread may run. New algorithms are needed to enable multiple threads to access the data structures concurrently. This means rewriting the code implementing the data structures. The new code is harder to verify for correctness, because of the inherently greater complexity of considering multiple concurrent execution paths instead of a single execution path.

Few verifiers that verify the correctness of parallel algorithms exist and all of them either merely verify very simple properties of a data structure or a data structure that only have simple properties, (see e.g., Vafeiadis, Shape-value Abstraction for Verifying Linearizability, VMCIA 2009, and Fraser, Practical lock-freedom, Technical Report, University of Cambridge, 2004). As a result, automated tools, such as correctness verifiers, are needed to help a developer evaluate the correctness of written code and to improve productivity, as well as improving the quality and reliability of the data structure itself.

In addition, verifying the correctness of a parallel algorithm has been historically viewed as a complex operation that is computationally intensive. Consequently, performing any analysis on the execution of an algorithm has been limited, if performed at all. For example, given all the possible atomic operations (i.e., operations irreducible to some other visible sub-operations) that may be performed upon a data structure, a software test program will execute these operations repeatedly, and in some random order, using multiple concurrent threads. The output of the test program is a history of all the atomic operations performed and their results. In general, a longer test program history includes a richer combination of operations (e.g., a greater number of overlapping operations), and accordingly improves the accuracy of the verifier. Using traditional verification methods, however, implies that longer histories required greater computational requirements. Thus there is a further need for an efficient verifier: one whose computational requirements do not grow excessively with the length of the history.

BRIEF SUMMARY OF THE INVENTION

A data structure may be defined as "correct" according to different criteria. In a non-limiting aspect of the present invention, an embodiment of the invention utilizes one broadly accepted criteria for correctness; namely linearizability, as defined in Herlihy, et al. "Linearizability: A Correctness Condition for Concurrent Objects", ACM Transactions on Programming Languages and Systems, 12(3):463-492 (1990). The linearizability property is a theoretical model of how sequential algorithms have to be executed in parallel to be correct.

In the exemplary embodiments described in further detail below, a method and a system are described to verify the linearizability property for an execution history produced by a test program implementing a sequential algorithm using a data structure. In addition, embodiments of the present invention traverses only once through the generated history result, thereby avoiding backtracking. Consequently, the computational requirements associated with embodiments of the present invention do not grow excessively as the length of the output history grows.

Therefore, one aspect of the present invention provides method, performed by a computing device, of verifying the correctness of an execution history that includes operations executed in parallel to a data structure, said method comprising:

defining a rule set that includes an operation rule set, that defines operation behavior on the data structure, a new state rule set and an obsolete state rule set;

reading the execution history from a storage device;

building an event set that includes a start event and an end event for each operation included in the execution history, where each event includes a timestamp according to the respective start time and end time of each operation;

processing each event in the event set sequentially, according to the timestamps of each respective event;

building a state set, in response to said processing, where a new state is added to the state set when processing an event creates a new state according to a new state rule included the new state rule set, and removing an obsolete state in the state set when processing an event removes an obsolete state according to a obsolete state rule included in the obsolete state rule set; and when the state set is empty, outputting a incorrect result to at least one of a storage device or a display device; wherein, when every event has been processed and the state set includes at least one state, outputting a correct result to at least one of a storage device or a display device.

Another aspect of the present invention provides a system of verifying the correctness of an execution history that includes operations to a data structure executed in parallel on a computing device, comprising:

means, implemented on a computing device, for defining a rule set that includes an operation rule set, that defines operation behavior on the data structure, a new state rule set and an obsolete state rule set;

means, implemented on a computing device, for reading the execution history from a storage device;

means, implemented on a computing device, for building an event set that includes a start event and an end event for each operation included in the execution history, where each event includes a timestamp according to the respective start time and end time of each operation;

means, implemented on a computing device, for processing each event in the event set sequentially, according to the timestamps of each respective event;

means, implemented on a computing device, for building a state set, in response to said processing, where a new state is added to the state set when processing an event creates a new state according to a new state rule included the new state rule set, and removing an obsolete state in the state set when processing an event removes an obsolete state according to a obsolete state rule included in the obsolete state rule set;

when the state set is empty, means, implemented on a computing device, for outputting a negative result to at least one of a storage device or a display device;

when every event has been processed and the state set includes at least one state, means, implemented on a computing device, for outputting a positive result to at least one of a storage device or a display device.

Yet another aspect of the present invention provides a computer-readable medium, embodying computer-executable program code, when executed by a computing device, adapts said computing device to perform a method of verifying the correctness of an execution history that includes operations executed in parallel to a data structure, said method comprising:

defining a rule set that includes an operation rule set, that defines operation behavior on the data structure, a new state rule set and an obsolete state rule set;

reading the execution history from a storage device;

building an event set that includes a start event and an end event for each operation included in the execution history, where each event includes a timestamp according to the respective start time and end time of each operation;

processing each event in the event set sequentially, according to the timestamps of each respective event;

building a state set, in response to said processing, where a new state is added to the state set when processing an event creates a new state according to a new state rule included the new state rule set, and removing an obsolete state in the state set when processing an event removes an obsolete state according to a obsolete state rule included in the obsolete state rule set; and when the state set is empty, outputting a incorrect result to at least one of a storage device or a display device; wherein, when every event has been processed and the state set includes at least one state, outputting a correct result to at least one of a storage device or a display device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

FIG. 1 is a table illustrating an exemplary an output history, according to one embodiment of the present invention.

FIG. 2 is a table illustrating an exemplary list of events according to one embodiment of the present invention.

FIG. 3 is an interval diagram illustrating a correct sequence of operations.

FIG. 4 is an interval diagram illustrating an incorrect sequence of operations.

FIG. 6 is a table of state definitions, according to one embodiment of the present invention.

FIG. 7 illustrates adding an insertion start event to a state set, according to one embodiment of the present invention.

DETAILED DESCRIPTION OF THE INVENTION

Figure 5:
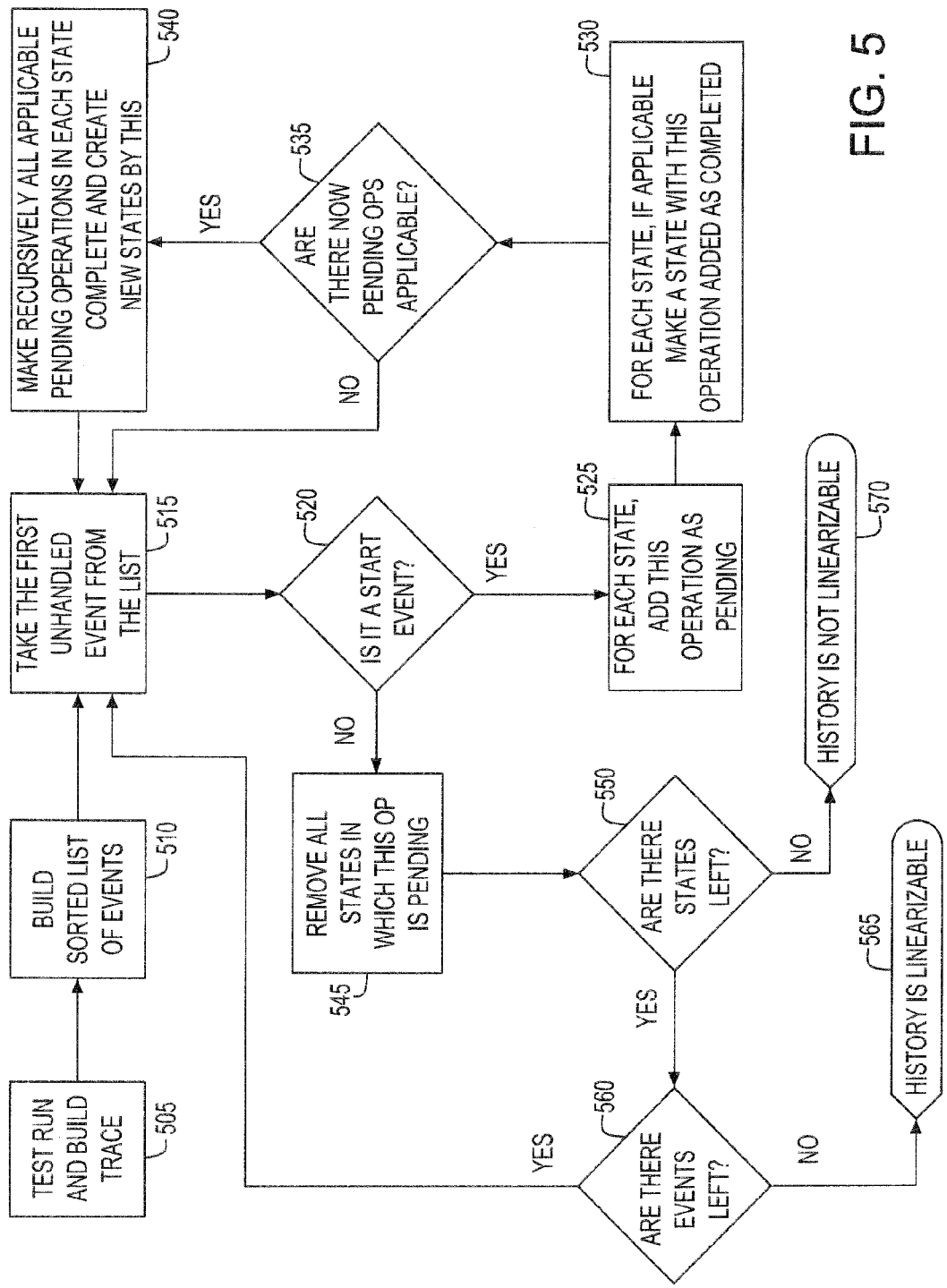
FIG. 5 is a flowchart illustration the operation according to one embodiment of the present invention.

To further simplify descriptions of embodiments, each embodiment discussed below assumes implementation of a verification tool that verifies a concurrent priority queue data structure. According to one definition of a concurrent priority queue data structure, only the element of highest priority is removed from the queue. An example use of such a data structure could include a scheduling algorithm to determine which task to process next. The discussion of a concurrent priority queue below, however, is not intended to be read as a limitation on the present invention and those skilled in the art would readily understand how other embodiments could be built using other data structures.

In one embodiment of the present invention, a correct sequential order for all atomic operations performed in a test run is identified, where the test run produces an execution trace (or "output history") of all atomic operations performed. Since the operations are performed on a multi-core processor, and the output history is a sequential listing of those operations, concurrent access to the data structure is ambiguous when processing the output history. Therefore, in one embodiment of the present invention, concurrency rules are defined to model the possible effects of performing the test run on a multi-core processor. For example, if an operation occurred strictly before another operation, meaning that the one operation ended before the other started, one embodiment of the present invention does not change the order. In addition, if operations occur concurrently, meaning that one operation started after another started but before the other operation ended, any order can be assumed, because when the effect of the operation took place is ambiguous. Thus, the present invention finds an ordering for all operations that is compatible with the properties of the data structure as defined by a set of rules inherent to the data structure's operation. Failing to find such a sequence of operations indicates that the data structure is not linearazible, as defined by Herlihy, et al.

To analyze different combinations of operations indicated in the output history, one embodiment of the present invention administrates a set of states (or "state set") that describe all possible states for all valid orderings of the executed operations. In addition, as soon as an operation starts, one embodiment of the present invention expands the set of states, depending on whether predefined conditions have been satisfied. Additional states are created, for example, when the test history is ambiguous with regard to whether the operation will be the next operation to take effect. Consequently, the new states describe different possible execution orderings of the operations. Moreover, if the operation takes effect, the effect produced might influence the effect time of other concurrent operations (as explained in further detail below), which again expands the number of valid possibilities. In order to find all possibilities, one embodiment of the present invention may perform a recursive analysis of the events.

States are removed from state set, according to one embodiment of the present invention, when an operations ends. For example, all states where the operation did not take effect are removed from the set of states, because these states cannot be correct if no valid execution time has been found for them. Accordingly, if there are still valid states at the end of the verification process, the history which was produced by the test run is verified as correct (i.e., linearizable). Alternatively, if at some point in time within the verification procedure the set of states is empty, no correct sequential ordering of the test run's output history has been found and thus the history is not linearizable.

To precisely define the effect of operations executed by a multi-core processor, one embodiment of the present invention defines events for each operation. The start of an operation is one event. The end of an operation is another event. Thus, if there are 5 different operations in a test run, 10 different events (i.e., a start and end event for each operation) will be created, according to one embodiment of the present invention. Moreover, each event takes place at a unique point in virtual time—where virtual time are a strictly monotonically increasing numeric values beginning a virtual time zero.

As mentioned previously, the figures and discussion below describe one embodiment of the present invention applied to verify an output history for a concurrent priority queue data structure. To simplify the discussion that proceeds, and not meant to be viewed as a limitation on the present invention, a priority queue is considered to be "correct" when each remove operation removes the element with highest priority. To further simplify the discussion, the embodiments below describe a max priority queue. In a max priority queue, the highest value stored in the priority queue is removed from the queue. Furthermore, the discussion below assumes the max priority queue is a concurrent max priority queue—i.e., the queue allows multiple accesses to its data in parallel (concurrently).

During a test run of a concurrent max priority queue, "insert" and "remove" operations are performed randomly and the operations are stored in an output history. To simulate concurrent operations, one embodiment of the present invention assigns each operation a unique timestamp to indicate the start time and end time of an operation. In this context, the start time of an operation is defined as a time before the actual operation starts execution and the end time for the operation is defined as a time after the successful execution of the operation. Thus, by defining an operation with a start and end timestamp, the operation is guaranteed to take effect within this range—no assumption is made, however, regarding when the operation took effect within the range. In addition, each timestamp must satisfy two conditions: each timestamp has to be unique and the timestamps have to be strictly monotonically increasing. Thus, according to one embodiment of the present invention, each event is considered to happen before another event if and only if its timestamp is smaller than the timestamp of the other event. Furthermore, each operation can be identified by either its start time or its end time.

FIG. 1 illustrates an exemplary output history file (or simply "log" file) with four operations. As illustrated, an operation is described by its type (e.g., "remove" or "insert"), its timestamps (e.g., start and end time) and the value removed or inserted. For convenience in the discussion below, a "log entry identifier" is used to describe an operation as a whole. Consequently, in FIG. 1, for each operation listed, there is one specific output history entry which can be uniquely identified by the parameters associated with the operation being performed by the multi-core processor.

As illustrated in FIG. 2, one embodiment of the present invention builds a sorted list of events from the log entries shown in FIG. 1. Thus, each atomic operation listed in the log of FIG. 1 is expanded to a start event and an end event, where the timestamps for each event is derived from the respective columns (i.e. start time and end time) in FIG. 1. After the event list illustrated in FIG. 2 is built, one embodiment of the present invention implements computer code including the event list of FIG. 2 to traverse the event list and processes each event, as described in further detail below. Thus, according to one embodiment, the event list is traversed once and does not require backtracking Traversing the event list, without backtracking, improves efficiency and allows long output histories (e.g., thousands or millions of operations) to be verified for correctness without greatly exceeding the computational requirements for verifying the correctness of a shorter output history.

FIG. 3 is an interval representation representing a possible execution sequence for the first few events shown in FIG. 2. Illustrated in FIG. 3, is timeline 300 and a series of operations (i.e. R0(null) 310 and R3(4) 340), each of which have time ranges. Furthermore, because these operations are being executed on a multi-core processor and are not assumed to be executed sequentially, any point within the time interval on timeline 300 for an operation is possible for the operation to take effect. Thus, an execution sequence is correct if there is a valid point on timeline 300, during the interval defined for an operation, when the operation can be executed and still comply with the linearizability property. For example, the history illustrated in FIG. 3 is correct. At time 0 on timeline 300, the max priority queue (not illustrated in FIG. 3) is empty. Consequently, the R0(null) 310 operation (i.e. a "remove" operation with id "0") may remove a null-value without affecting the other operations when the R0(null) 310 operation starts at time 0. Note, however, the correctness of the next, operation R3(4) 340 (a "remove" operation with id "3") is uncertain at this point, because R3(4) 340 is interleaving with both "insert" operations: insert operation I1(4) 320 and insert operation I2(5) 330 on timeline 300. As previously discussed, due to the inherent ambiguity when data operations are performed in parallel on a multi-core processor and the overlap shown in FIG. 3 between the I1(4) 320 operation and the R3(4) 340 operation, it is possible that both "insert" operations, none of them or one of them had taken effect at the time the R3(4) 340 operation removes the "4" element from the priority queue. Thus, the correctness of R3(4) 340 is uncertain in FIG. 3. Resolution of this ambiguity is described below, with respect to the application of one embodiment of the present invention to the sample data shown in FIG. 3.

FIG. 4 is another example of an interval representation and demonstrates an event list that is incorrect. That is, as shown in FIG. 4, a different event list than the one shown in FIG. 2 is being applied to timeline 400. Starting at 0 on timeline 400, the max priority queue (not shown) is empty. Insert operation I0(9) 410 begins at time 0, and consequently, the inserted value "9" is the "peak"—or highest value—in the max priority queue. Next, I1(10) inserts a value of "10" into the max priority queue and its value become the peak. Consequently, when remove operation R2(9) 430 begins, the highest element in the queue is 10. Furthermore, at no point during the interval of R2(9) 430 would the highest element in the queue become 9. As previously stated, according to the concurrency rules for a max priority queue (not illustrated in FIG. 4), a remove operation is valid only when it removes the highest value for the queue. Thus, R2(9) 430 is not a valid operation and, therefore, the sequence shown in FIG. 4 is incorrect. It is worth noting, however, if R2(9) 430 were not in the history, the history shown in FIG. 4 would be valid, because remove operation R4(10) 440 would be associated with insert operation I1(10) 420. A demonstration of how this result is produced, according to the application of one embodiment of the present invention to the sample data shown in FIG. 4, is described below.

Consequently, as illustrated in FIG. 4, one embodiment of the present invention determines, by defining a concurrency rule, that a remove operation could not be assigned (or paired) to a corresponding insert operation, and still respect the max priority queue property. Accordingly, when the remove operation cannot to be assigned, the history is deemed invalid, according to one embodiment of the present invention, and the history is rejected.

Thus, according to one embodiment of the present invention, states may be expanded and collapsed in response to events, as discussed below. For example, before the first operation, there is only one single state, which indicates that the data structure (i.e., max priority queue, as described above) is empty and there are no operations pending. Originating from this initialized state, events will modify the state of the data structure and create additional states, according to concerning rules defined for the data structure being verified.

FIG. 5 is a flowchart illustrating the methodology for managing of states (i.e. expansion and collapse of states) according to one embodiment of the present invention. In step 505, a test run is executed to build an execution trace (as shown, for example, in FIG. 1). For example, the test run executes software which utilizes a concurrently accessed data structure—such as a max priority queue executed on a multi-core architecture. From the execution trace, a sorted list of events is created in step 510. As discussed above, in one embodiment of the present invention, each atomic operation in the executed in the execution trace produces two events (a start event and end event) and each event has a timestamp. Thus, according to one embodiment of the present invention, the stored list of events created in step 510 includes a list of events sorted by timestamps, such that the sorted list is strictly monotonically increasing (as shown, for example, in FIG. 2).

Step 515 begins the event processing loop, as discussed below, and processes the first unhandled event from the sorted list created in step 510. At step 520, one embodiment of the present invention determines whether the event processed at step 515 is a start event. When processing a start event, according to one embodiment of the present invention, the operation coinciding with the start event is added to each pending state in step 525. Then, for each state currently pending, step 530 adds a new state that completes the operation, if possible. Completion of the operation depends on a set of concurrency rules defined for the data structures and solutions executed in the test run of step 505. For example, with the max priority queue described above, a rule could be defined that completes every insert operation at step 530 (since an insert operation does not depend on another operation to be completed). A remove operation, however, would not be completed at step 530, because a completed remove operation requires a matching insert operation (as defined for a max priority queue) to be complete.

Subsequently, in step 535, one embodiment of the present invention determines whether any pending operations remain in the current state set. If not, according to one embodiment of the present invention, the process returns to step 515 to begin processing the next event in the sorted list of event created in step 510. When pending operations remain in the state set, however, one embodiment of the present invention recursively applies the pending operations to each state at step 540 to create new states, thus completing the operation.

Returning to step 520, if it is determined that an end state is encountered, one embodiment of the present invention removes all states in the state set at step 545 where the operation (coinciding with the end event removed from the sorted event list in step 520) is pending Subsequently, when, according to one embodiment of the present invention, it is determined at step 550 that the state set is empty, the process illustrated in FIG. 5 ends at step 570 and outputs the "history is not linearizable" to a display device or a storage device, for example. If at step 550, it is determined that the state set is not empty, one embodiment of the present invention determines whether any events remain in the sorted event list at step 560. Upon determining that all events have been processed, one embodiment of the present invention outputs "history is linearizable" to a display device or storage device, for example, at step 565. If there are events in the sorted event list which have not been processed, one embodiment of the present invention returns to step 515 to being processing the next event.

In FIGS. 6-13, specific examples according to one embodiment of the present invention are discussed. The examples according to FIGS. 6-13 may be implemented on a general purpose computing device, such as the example computing device illustrated in FIG. 14, where the computing device has been adapted to fulfill a specific purpose through the execution of computer-readable instructions. These computer-readable instructions may be prepared by a programmer using any means currently known in the art—one example being the Java™ or like programming language, as discussed with respect to the examples below. It is understood that the embodiments described, however, are not limited to the Java™ programming language.

Thus, for example, the constitution of a state may be defined according to the table illustrated in FIG. 6. The table in FIG. 6 uses the concept of data "collections" as described in the Java™ programming language (see, e.g., Zakhour et al., The Java™ Tutorial: A Short Course on the Basics, 4th Edition (2006))—where the contents of the collections include the values to be added or removed from the data structure (i.e., values added to the concurrent max priority queue would be included in the "finished insertions" collection). The use of collections in Java™, however, is but one implementation and one skilled in the art would recognize other data constructs are possible. In a further example, one data collection that is shared by all states is defined as a "definite heap" collection describing the stored contents in the max priority queue, as being acted upon by all states in the state set. Thus, in the embodiment described above, the definite heap collection contains all log entries of completed insert operations which otherwise would have been stored in the "finished insertions" structure of all states, as illustrated in FIG. 6. Consequently, for each state the max priority queue described above consists of the elements in the definite heap plus the elements contained in the finished inserts structure.

To further simplify the notation within FIGS. 7-13, a log entry is described by a letter indicating the operation followed by a log entry identifier and a value in parenthesis. For example, the entry I2(15) denotes an "insert" operation with id "2" inserting an element with value 15. Furthermore, a list is denoted by brackets and elements within the list are separated by commas and a pair is denoted by parenthesis. Furthermore, the following state description abbreviations are used in FIGS. 7-13:

pR="pending removals" collection
aR="associated removals" collection
pI="pending insertions" collection
fI="finished insertions" collection
dH="definite heap" collection According to one embodiment of the present invention, a concurrency rule is defined such that a start event (e.g., start I6(5) 710) for an insert operation implies one more pending insert operation(s). Consequently, each state in the state set is modified by adding the corresponding log entry identifier to the pending inserts collection as shown in FIG. 7. In the example shown in FIG. 7, state 720 has been modified by adding the I6(5) operation to the pI 726 collection to become state 730 (with the I6(5) operation included in pI 736).

Figure 8:
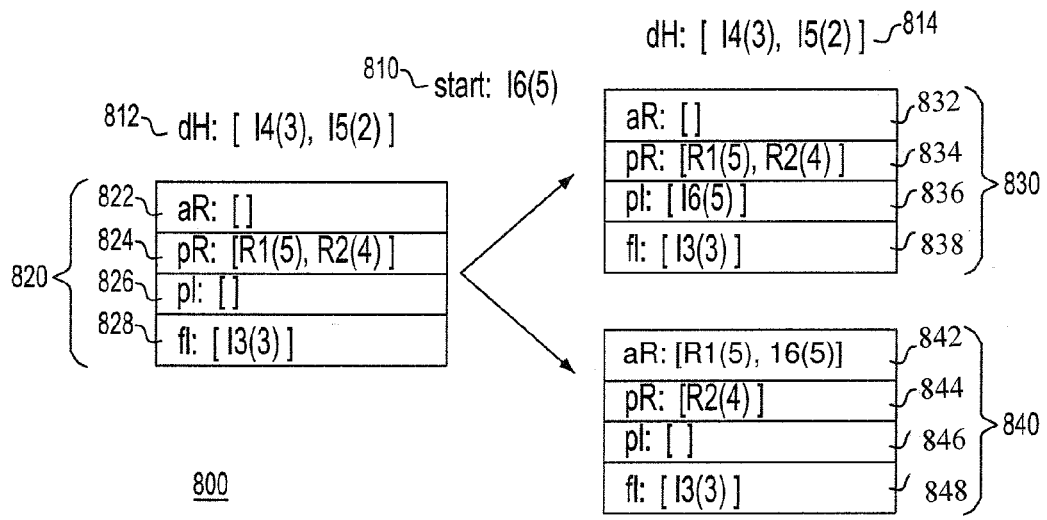
FIG. 8 illustrates adding an insertion start event to a state set, according to another embodiment of the present invention.

As illustrated in FIG. 8, another concurrency rule is defined such that for each state where an insert operation inserts a higher or equal value than the peak of the max priority queue, the pending removals collection is checked to determine whether there is a pending remove operation that removes this value. Thus, in an example state set 800, the start of operation I6(5) 810 affects state 820 because the value inserted is equal to the peak of the max priority queue (as indicated by the dH 812 collection). Consequently, the concurrency rule dictates when there is a corresponding remove operation, new state 840 having state elements 842, 844, 846, 848 is created—in accordance with the embodiment illustrated in FIG. 5 at step 540—that adds the associated insert/remove pair to the aR 842 collection and removes the found removed operation from the pR 844 collection. Furthermore, state 820 is modified to become state 830 having state elements 832, 834, 836, 838, where the I6(5) operation is added to the pI 836 collection.

Figure 9:
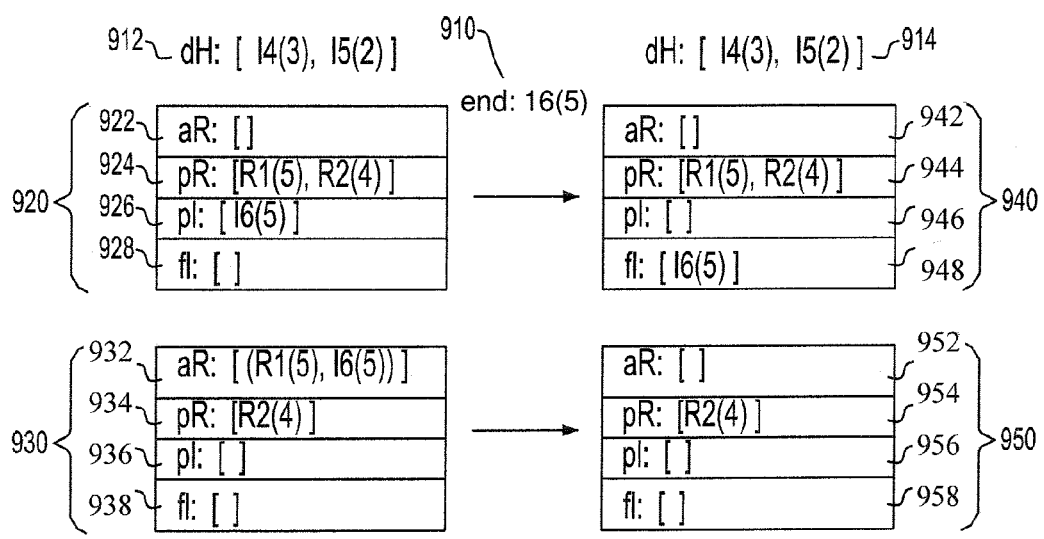
FIG. 9 illustrates adding an insertion end event to a state set, according to one embodiment of the present invention.

FIG. 9 illustrates an example state set 900, when an insertion ends (e.g., I6(5) 910). Upon reaching this event, one embodiment of present invention goes through state set 900 to determine whether the ending insertion (e.g., I6(5) 910) is still in the pending insertions collection described in FIG. 6. If the insert operation is not pending, then the insert operation is a part of an associated pair contained in the associated removes collection. The insert operation is removed from the list if the remove operation, which is the second component in the association pair, is completed as well. If the pending insertions collection contains the insert operation, one embodiment of the present invention removes the insert operation from the pending insertions collection and adds the insert operation to the finished insertions collection. Both operations are illustrated in FIG. 9. In state 920 having state elements 922, 924, 926, 928, insert I6(5) 910 is in pI 926 and upon processing the end event of I6(5) 910, state 920 becomes state 940 having state elements 942, 944, 946, 948, with insert I6(5) 910 added to the fI 948 collection. On the other hand, in state 930 as insert I6(5) 910 in the aR 932 collection; thus, state 930 becomes 950 having state elements 952, 954, 956, 958, when both insert I6(5) 910 and the associated remove operation end. Although not illustrated in FIG. 9, according to another embodiment of the present invention, if an insert operation (e.g., insert I6(5) 910) is in the finished insertions collections of all states, the insert operation is removed from every state in the state set and added to the definite heap collection.

Figure 10:
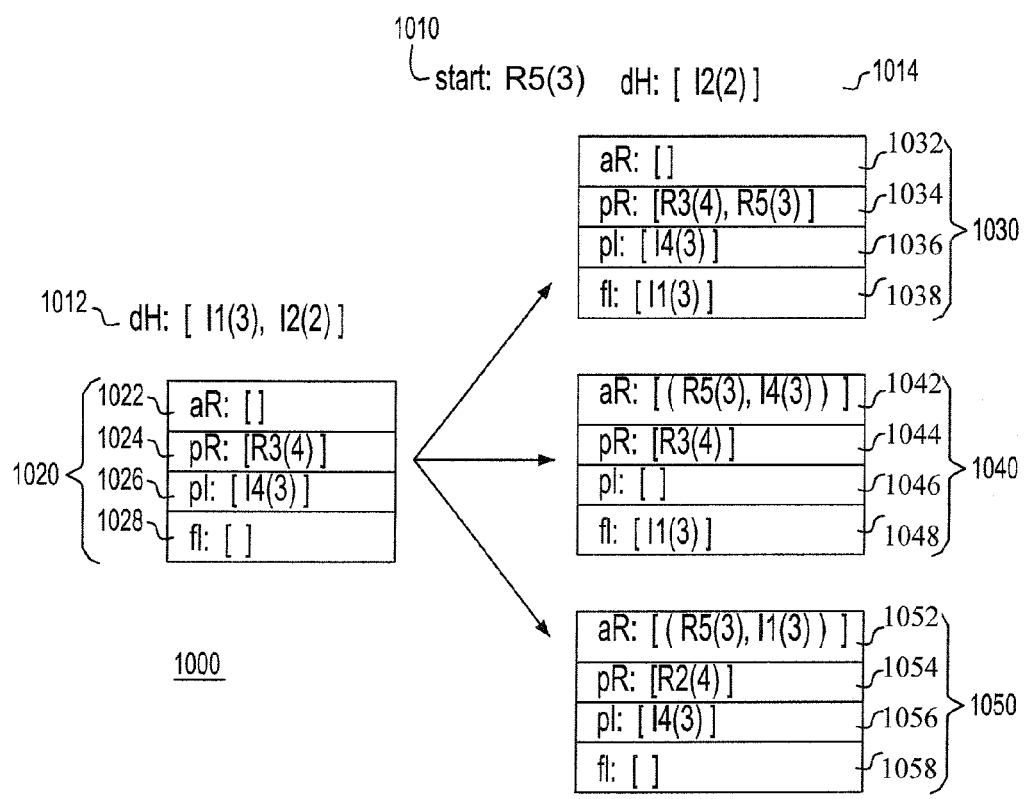
FIG. 10 illustrates adding a remove start event to a state set, according to one embodiment of the present invention.

FIG. 10 illustrates an example state set 1000, with start event R5(3) 1010 corresponding to a remove operation, being added to state set 1000. According to one embodiment of the present invention, the start of a remove operation is the most complex event of the possible events (e.g., start insert, start remove, end insert and end remove). As stated previously, each state in the state set is modified by adding this operation to the pending removals collection (e.g. pR 1034 in state 1030 having state elements 1032, 1034, 1036, 1038,), comparable to the start event for an insert operation. When the remove operation removes a value higher than or equal to the value of the max priority queue, one embodiment of the present invention traverses the pending insertions collection (e.g. pI 1026 in state 1020 having state elements 1022, 1024, 1026, 1028,) and creates a new state (e.g., state 1040 having state elements 1042, 1044, 1046, 1048,) for each association (as shown in aR 1042 of state 1040) that can be made with an appropriate insert operation. In addition, if the removed value is equal to the max priority queue peak, a new state is created (e.g., state 1050 having state elements 1052, 1054, 1056, 1058,) and associated with the peak of the max priority queue (as shown in aR 1052 of state 1050). If the peak is in the definite heap collection (e.g. dH 1012 in FIG. 1000), the operand value of the remove operation is removed from definite heap collection (see dH 1014) and added to the finished insertions collection of every state in the state set (e.g., states 1030, 1040 and 1050). Next, though not shown in FIG. 10, the pending remove operations are recursively associated with other pending insert operations since a new peak has been defined in the definite heap, with possibly a lower value. Associating pending remove operation with the new peak is also part of the recursion, also not shown in FIG. 10. In one embodiment of the present invention, combinatoric methods may be applied during the recursive steps to effectively handle the state set.

Figure 11:
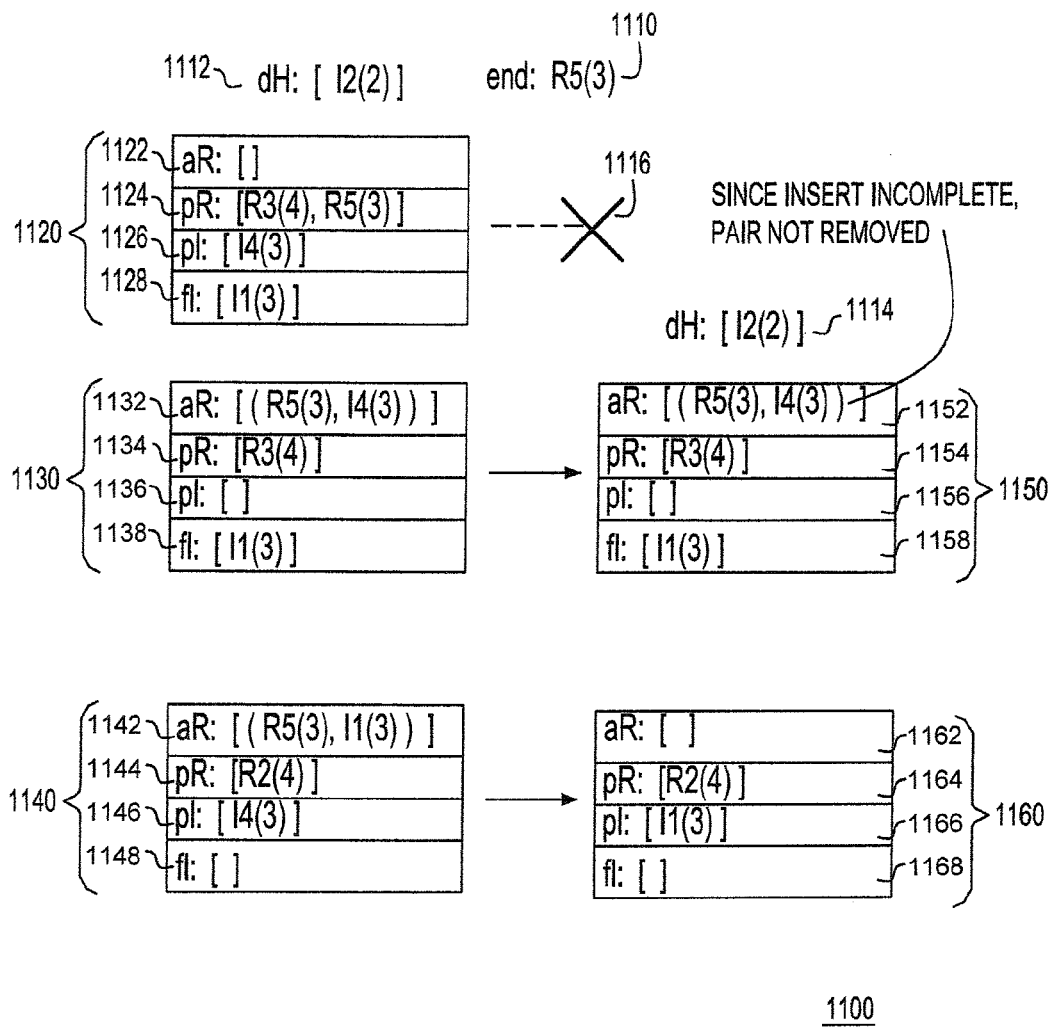
FIG. 11 illustrates adding a remove end event to a state set, according to one embodiment of the present invention.

Shown in FIG. 11 is an example end of a remove operation (e.g., R5(3) 1110) that is the event which reduces the cardinality of the state set (e.g., 1100). By handling this event, states that are removed from the state set that are shown to be invalid. For example, in state 1120 having state elements 1122, 1124, 1126, 1128, the remove operation is still in the pR 1124 collection. Consequently, state 1120 is removed from state set 1100, as shown in reference numeral 1116, because the remove operation cannot be associated with an insert operation. If the event corresponds to a remove operation (e.g., R5(3) 1110) is not in the pending removals collection (as shown, for example, in pR 1134 and pR 1144 of state set 1100), the remove operation would be in the associated removals collections (e.g., aR 1132 and aR 1142). Similar to processing the end event to an insert operation, one embodiment of the present invention checks whether the insert operation that part of the associated pair is completed as well. When the paired insert operation is not completed, the insert/remove pair remains in the aR collection (e.g., aR 1152 in state 1150 having state elements 1152, 1154, 1156, 1158) and if both the insert and remove operations have ended, the pair deleted (see state 1160 having state elements 1162, 1164, 1166, 1168). As with the end operation for an insert operation—according to one embodiment of the present invention—if after this event no state is left, the output history is invalid.

Although not illustrated in FIG. 11, a null-removal (i.e., a remove operation that has not operand) is a special case. As soon as there is a point in time where null could have been removed, the operation is removed immediately and do not consider the case that null could have been removed at a later time.

Figure 12:
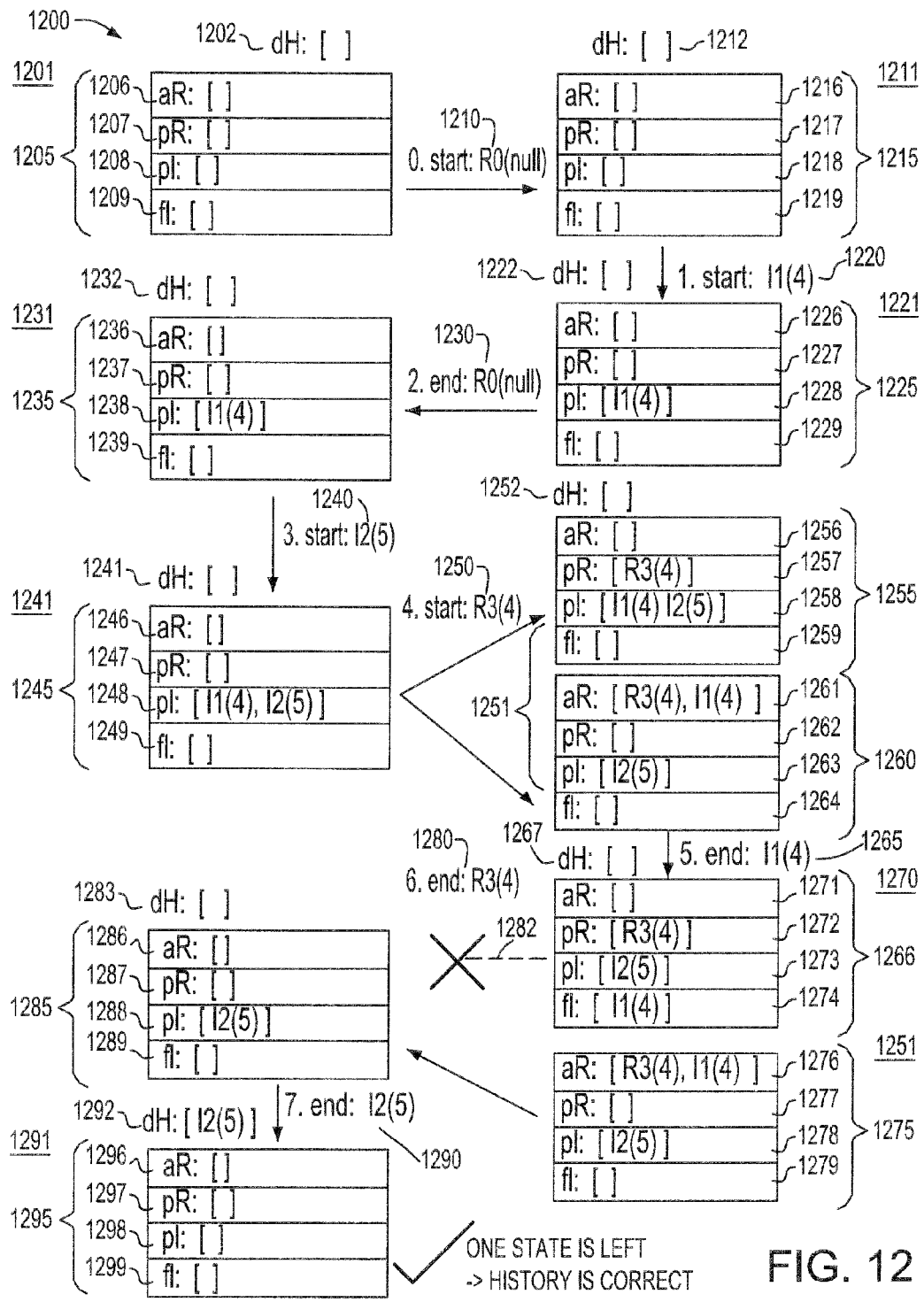
FIG. 12 illustrates the changes undergone to a state set when processing the example of shown in FIG. 3, according to one embodiment of the present invention.

FIG. 12 shows a sequence of example state changes 1200, according to one embodiment of present invention that verified the example data shown in FIG. 3. State set 1201 illustrates the initial condition, with event 1210 being the first event to be processed. Since event 1210 corresponds to a null-removal, none of the states in the state set 1211 are changed. Event 1220 adds the I1(4) operation to state set 1221 (see pI 1228) and event 1230 ends the insert operation. Event 1240 begins the second insert operation, which adds I2(5) to the existing states (see pI 1248), but event 1250 begins the R3(4) operation before the I2(5) ends—consequently, states 1255 and 1260 are created with the R3(4) operation added to pR 1257 and aR 1261, respectively. Next, event 1265 is processed, which leads to states 1270 and 1275, where I1(4) is added to fI 1274 and I1(4), respectively. During event 1280, since state 1270 has R3(4) in pR 1222, state 1270 is deemed invalid and removed from the state set 1281, as illustrate by reference numeral 1282. State 1275, however, removes an Insert/Remove pair from aR 1276 to become state 1285. Subsequently, event 1290 is the last operation, which ends operation I2(5). Since state set 1291 is not empty, the sequence of operations corresponding the state 1295 is verified to be correct. Incidentally, since all the states in state set 1291 include the I2(5) insert operation, dH 1292 includes the I2(5) operation.

Figure 13:
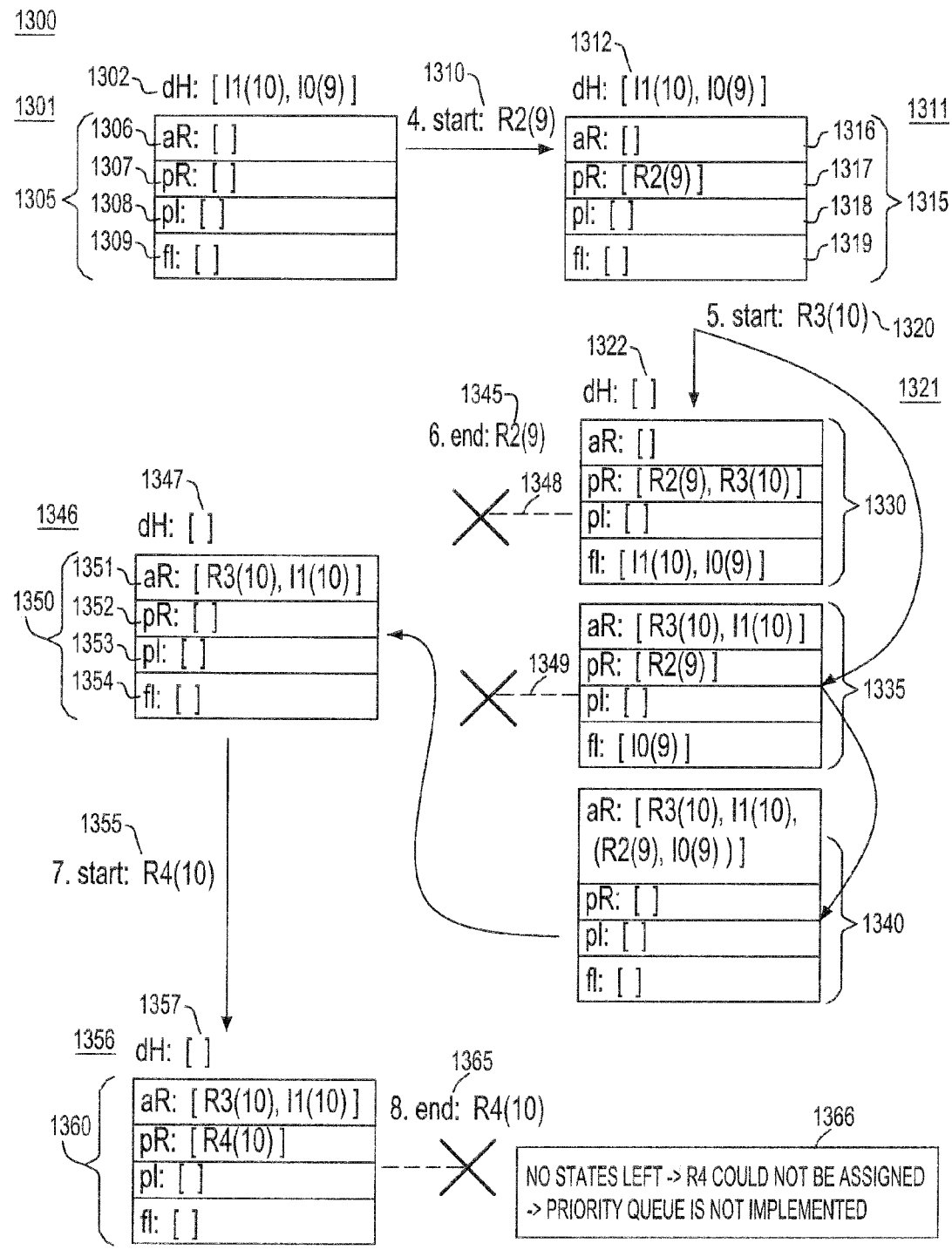
FIG. 13 illustrates the changes undergone to a state set when processing the example of shown in FIG. 4, according to one embodiment of the present invention.

FIG. 13 shows an example sequence of state changes 1300, according to one embodiment of present invention that demonstrated the error in the example data shown in FIG. 4. As with FIG. 12, state set 1301 illustrates the conditions of the states (e.g., state 1305) before processing event 1310. When event 1310 is processed, state set 1301 is modified to state set 1311 (e.g., state 1315 includes R2(9) in pR 1317). Next, event 1320 begins the second remove operation. Due to the contents of dH 1312, processing event 1320 adds states 1330, 1335 and 1340 to state set 1321. During the processing of event 1345, state 1330 and 1345 are removed from state set 1321, as shown in state set 1346 (see e.g., reference numerals 1348 and 1349). Processing event 1355 modifies state 1350 in state set 1346 to state 1360 in state set 1356. Event 1365 removes state 1360 from state set 1356—resulting in an empty state set, as shown in reference numeral 1366.

Figure 14:
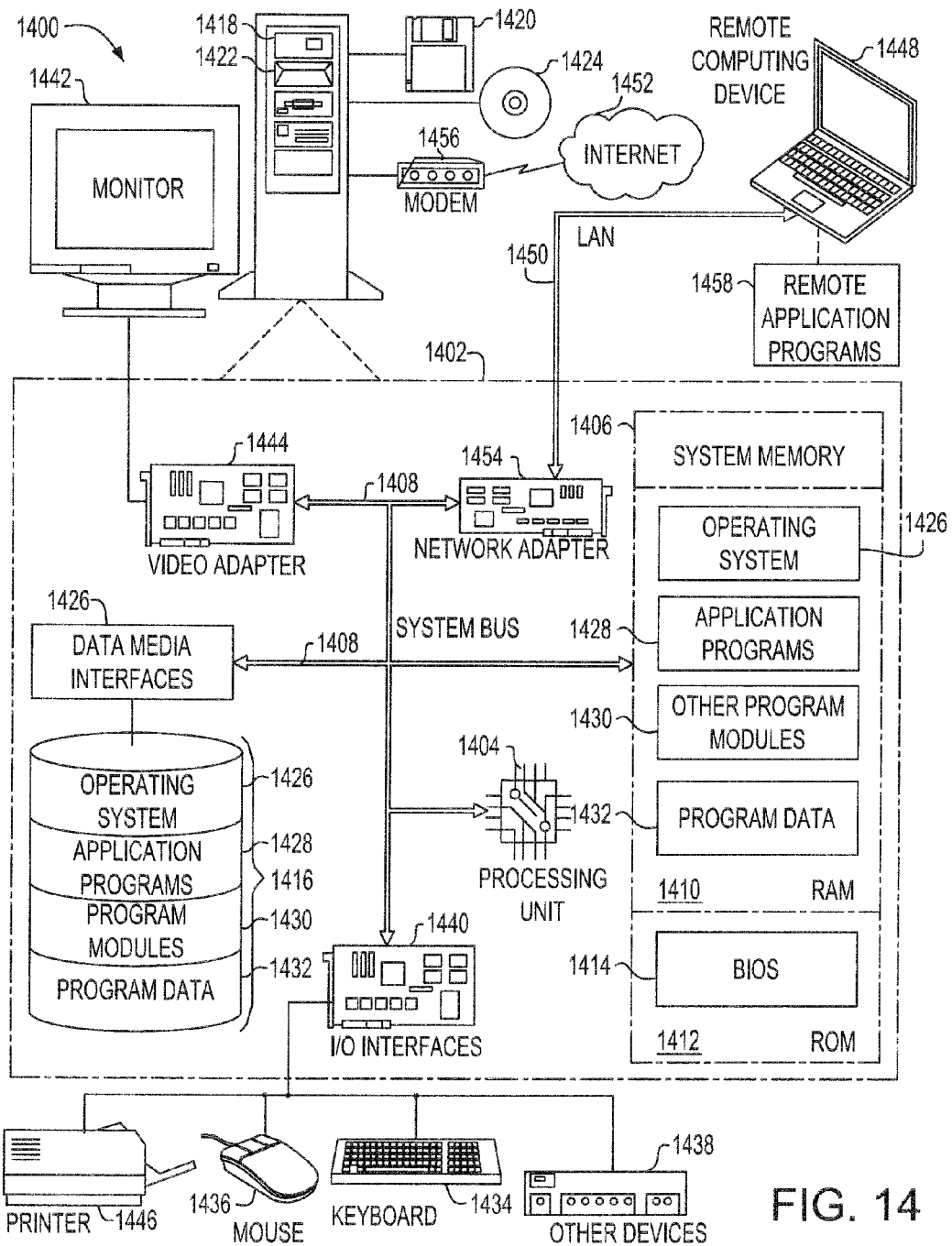
FIG. 14 is a schematic illustration describing a system according to one embodiment of the present invention

FIG. 14 illustrates a general computer environment 1400, according to one embodiment of the present invention that can be used to implement the verification techniques described herein. The computer environment 1400 is only one example of a computing environment and is not intended to suggest any limitation as to the scope of use or functionality of the computer and network architectures. Neither should the computer environment 1400 be interpreted as having any dependency or requirement relating to any one or combination of components illustrated in the exemplary computer environment 1400.

Computer environment 1400 includes a general-purpose computing device in the form of a computer 1402. The components of computer 1402 can include, but are not limited to, one or more processors or processing units 1404, a system memory 1406, and a system bus 1408 that couples various system components including the processor 1404 to the system memory 1406.

The system bus 1408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1402 typically includes a variety of computer readable media. Such media can be any available media that is accessible by computer 1402 and includes both volatile and non-volatile media, removable and non-removable media.

The system memory 1406 includes computer readable media in the form of volatile memory, such as random access memory (RAM) 1414, and/or non-volatile memory, such as read only memory (ROM) 1412. A basic input/output system (BIOS) 1414, containing the basic routines that help to transfer information between elements within computer 1402, such as during start-up, is stored in ROM 1412. RAM 1410 typically contains data and/or program modules that are immediately accessible to and/or presently operated on by the processing unit 1404.

Computer 1402 may also include other removable/non-removable, volatile/non-volatile computer storage media. By way of example, FIG. 14 illustrates a hard disk drive 1416 for reading from and writing to a non-removable, non-volatile magnetic media (not shown), a magnetic disk drive 1418 for reading from and writing to a removable, non-volatile magnetic disk 1420 (e.g., a "floppy disk"), and an optical disk drive 1422 for reading from and/or writing to a removable, non-volatile optical disk 1424 such as a CD-ROM, DVD-ROM, or other optical media. The hard disk drive 1416, magnetic disk drive 1418, and optical disk drive 1422 are each connected to the system bus 1408 by one or more data media interfaces 1426. Alternatively, the hard disk drive 1416, magnetic disk drive 1418, and optical disk drive 1422 can be connected to the system bus 1408 by one or more interfaces (not shown).

The disk drives and their associated computer-readable media provide non-volatile storage of computer readable instructions, data structures, program modules, and other data for computer 1402. Although the example illustrates a hard disk 1416, a removable magnetic disk 1420, and a removable optical disk 1424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1416, magnetic disk 1420, optical disk 1424, ROM 1412, and/or RAM 1410, including by way of example, an operating system 1426, one or more application programs 1428, other program modules 1430, and program data 1432. Each of such operating system 1426, one or more application programs 1428, other program modules 1430, and program data 1432 (or some combination thereof) may implement all or part of the resident components that support the distributed file system.

A user can enter commands and information into computer 1402 via input devices such as a keyboard 1434 and a pointing device 1436 (e.g., a "mouse"). Other input devices 1438 (not shown specifically) may include a microphone, joystick, game pad, satellite dish, serial port, scanner, and/or the like. These and other input devices are connected to the processing unit 1404 via input/output interfaces 1440 that are coupled to the system bus 1408, but may be connected by other interface and bus structures, such as a parallel port, game port, or a universal serial bus (USB).

A monitor 1442 or other type of display device can also be connected to the system bus 1408 via an interface, such as a video adapter 1444. In addition to the monitor 1442, other output peripheral devices can include components such as speakers (not shown) and a printer 1446 which can be connected to computer 1402 via the input/output interfaces 1440.

Computer 1402 can operate in a networked environment using logical connections to one or more remote computers, such as a remote computing device 1448. By way of example, the remote computing device 1448 can be a personal computer, portable computer, a server, a router, a network computer, a peer device or other common network node, and the like. The remote computing device 1448 is illustrated as a portable computer that can include many or all of the elements and features described herein relative to computer 1402.

Logical connections between computer 1402 and the remote computer 1448 are depicted as a local area network (LAN) 1450 and a general wide area network (WAN) 1452. Both the LAN and WAN form logical connections via wired communication mediums and appropriate communication protocols (such as Ethernet, see e.g., IEEE 802.3-1998 Std) or wireless communication mediums and appropriate communications protocols (such as Wi-Fi, see e.g., IEEE 802.11-2007 Std). Such networking environments are commonplace in homes, offices, enterprise-wide computer networks, intranets, and the Internet.

When implemented in a LAN networking environment, the computer 1402 is connected to a local network 1450 via a network interface or adapter 1454. When implemented in a WAN networking environment, the computer 1402 typically includes a modem 1456 or other means for establishing communications over the wide network 1452. The modem 1456, which can be internal or external to computer 1402, can be connected to the system bus 1408 via the input/output interfaces 1440 or other appropriate mechanisms. It is to be appreciated that the illustrated network connections are exemplary and that other means of establishing communication link(s) between the computers 1402 and 1448 can be employed.

In a networked environment, such as that illustrated with computing environment 1400, program modules depicted relative to the computer 1402, or portions thereof, may be stored in a remote memory storage device. By way of example, remote application programs 1458 reside on a memory device of remote computer 1448. For purposes of illustration, application programs and other executable program components such as the operating system are illustrated herein as discrete blocks, although it is recognized that such programs and components reside at various times in different storage components of the computing device 1402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method, performed by a computing device, of verifying the correctness of an execution history that includes operations executed in parallel to a concurrent priority queue having insert and remove operations, said method comprising:

defining a rule set that includes an operation rule set, that defines insert and remove operation behavior on the priority queue, a new state rule set and an obsolete state rule set;

reading the execution history from a storage device;

building a list of events to be processed that includes a start of insertion event, an end of insertion event, a start of removal event and an end of removal event for each operation included in the execution history, where each event includes a timestamp according to the respective start time and end time of each operation;

processing each event in the list of events sequentially, according to the timestamps of each respective event;

building a state set, in response to said processing, each state set having: a definite heap collection including a data set shared by all states including the elements in the priority queue; an "associated removal" list including a collection of pairs of insert and remove operations; a "pending removal" list including a collection of remove operations; a "pending insert" list including a collection of insert operations; and a "finished insertion" list including a collection of insertion operations that have succeeded;

where a new state is added to the state set when processing an event creates a new state according to a new state rule included the new state rule set, and removing an obsolete state in the state set when processing an event removes an obsolete state according to a obsolete state rule included in the obsolete state rule set; and when the state set is empty, outputting a incorrect result to at least one of a storage device or a display device; wherein, when every event has been processed and the state set includes at least one state, outputting a correct result to at least one of a storage device or a display device.

2. The method according to claim 1, wherein an obsolete state rule is defined in the obsolete state rule set that removes a state upon processing an end event and the state describes the end event as pending.

3. The method according to claim 1, wherein a new state is defined in the new state rule set that creates a new state when a value is added to the concurrent priority queue, according to the insert operation, which has a lower value that a highest priority value in the concurrent priority queue.

4. The method according to claim 1, wherein processing the events further includes adding an event to each state when processing a new event.

5. The method according to claim 4, further comprising determining for each state in the state set whether the operation corresponding to the event has completed upon processing a start event.

6. The method according to claim 5, further comprising applying pending operations in each state to make each operation complete when at least one state in the state set has a pending operation.

7. The method according to claim 1, wherein a rule of said rule set corresponding to said start insertion operation provides adding a corresponding insert operation to the "pending insert" list of insert operations, wherein when a corresponding insert operation adds a value greater or equal to the maximum in the "definite" heap, said method comprising: modifying each state which includes a corresponding remove operation of that value by adding the insert operation to the "pending insertions" list; and said method creating a further new state including the insert-remove pair in the "associated removal" list.

8. The method according to claim 1, wherein an end insertion operation includes:

traversing said state set to determine if end insertion value is still in the "pending insertions" list and one of:

if the insert operation is not pending, then the insert operation is a part of an associated pair contained in the associated removes collection and the insert operation is removed from the list if the remove operation; or if the pending insertions collection includes the insert operation, then removing the insert operation from the pending insertions collection and adding the insert operation to the finished insertions collection.

9. A system of verifying the correctness of an execution history that includes insert and remove operations applied to a concurrent priority queue executed in parallel on a computing device, the system comprising a programmed processor unit and associated memory storage unit, said programmed processor unit configured to run a method comprising:

defining a rule set that includes an operation rule set, that defines insert and remove operation behavior on said priority queue, a new state rule set and an obsolete state rule set;

reading the execution history from a storage device;

building a list of events to be processed that includes a start of insertion event, an end of insertion event, a start of removal event and an end of removal event for each operation included in the execution history, where each event includes a timestamp according to the respective start time and end time of each operation that includes a start event and an end event for each operation included in the execution history;

processing each event in the list of events sequentially, according to the timestamps of each respective event;

building a state set, in response to said processing, each state set having: a definite heap collection including a data set shared by all states including the elements in the priority queue; an "associated removal" list including a collection of pairs of insert and remove operations; a "pending removal" list including a collection of remove operations; a "pending insert" list including a collection of insert operations; and a "finished insertion" list including a collection of insertion operations that have succeeded;

where a new state is added to the state set when processing an event creates a new state according to a new state rule included the new state rule set, and removing an obsolete state in the state set when processing an event removes an obsolete state according to a obsolete state rule included in the obsolete state rule set;

when the state set is empty, means, implemented on a computing device, for outputting a negative result to at least one of a storage device or a display device;

when every event has been processed and the state set includes at least one state, means, implemented on a computing device, for outputting a positive result to at least one of a storage device or a display device.

10. The system according to claim 9, wherein an obsolete state rule is defined in the obsolete state rule set that removes a state upon processing an end event and the state describes the end event as pending.

11. The system according to claim 9, wherein a new state is defined in the new state rule set that creates a new state when a value is added to the concurrent priority queue, according to the insert operation, which has a lower value that a highest priority value in the concurrent priority queue.

12. The system according to claim 9, wherein processing the events further includes adding an event to each state when processing a new event.

13. The system according to claim 12, further comprising means, implemented on a computing device, for determining for each state in the state set whether the operation corresponding to the event has completed upon processing a start event.

14. The system according to claim 13, further comprising means, implemented on a computing device, for applying pending operations in each state to make each operation complete when at least one state in the state set has a pending operation.

15. The system according to claim 9, wherein a rule of said rule set corresponding to said start insertion operation provides adding a corresponding insert operation to the "pending insert" list of insert operations, wherein when a corresponding insert operation adds a value greater or equal to the maximum in the "definite" heap, said method comprising: modifying each state which includes a corresponding remove operation of that value by adding the insert operation to the "pending insertions" list; and said method creating a further new state including the insert-remove pair in the "associated removal" list.

16. The system according to claim 9, wherein an end insertion operation includes:
traversing said state set to determine if end insertion value is still in the "pending insertions" list and one of:
if the insert operation is not pending, then the insert operation is a part of an associated pair contained in the associated removes collection and the insert operation is removed from the list if the remove operation; or
if the pending insertions collection includes the insert operation, then removing the insert operation from the pending insertions collection and adding the insert operation to the finished insertions collection.

17. A tangible computer-readable memory device, embodying computer-executable program code, when executed by a computing device, adapts said computing device to perform a method of verifying the correctness of an execution history that includes insert and remove operations executed in parallel applied to a concurrent priority queue, said method comprising:
defining a rule set that includes an operation rule set, that defines insert and remove operation behavior on the priority queue, a new state rule set and an obsolete state rule set;
reading the execution history from a storage device;
building a list of events to be processed that includes a start of insertion event, an end of insertion event, a start of removal event and an end of removal event for each operation included in the execution history, where each event includes a timestamp according to the respective start time and end time of each operation;
processing each event in the list of events sequentially, according to the timestamps of each respective event;
building a state set, in response to said processing, each state set having: a definite heap collection including a data set shared by all states including the elements in the priority queue; an "associated removal" list including a collection of pairs of insert and remove operations; a "pending removal" list including a collection of remove operations; a "pending insert" list including a collection of insert operations; and a "finished insertion" list including a collection of insertion operations that have succeeded;
where a new state is added to the state set when processing an event creates a new state according to a new state rule included the new state rule set, and removing an obsolete state in the state set when processing an event removes an obsolete state according to a obsolete state rule included in the obsolete state rule set; and
when the state set is empty, outputting a incorrect result to at least one of a storage device or a display device; wherein,
when every event has been processed and the state set includes at least one state, outputting a correct result to at least one of a storage device or a display device.

18. The tangible computer-readable memory device according to claim 17, wherein an obsolete state rule is defined in the obsolete state rule set that removes a state upon processing an end event and the state describes the end event as pending.

19. The tangible computer-readable memory device according to claim 17, wherein a new state is defined in the new state rule set that creates a new state when a value is added to the concurrent priority queue, according to the insert operation, which has a lower value that a highest priority value in the concurrent priority queue.

20. The tangible computer-readable memory device according to claim 17, wherein processing the events further includes adding an event to each state when processing a new event.

21. The tangible computer-readable memory device according to claim 20, further comprising determining for each state in the state set whether the operation corresponding to the event has completed upon processing a start event.

22. The tangible computer-readable memory device according to claim 21, further comprising applying pending operations in each state to make each operation complete when at least one state in the state set has a pending operation.

23. The tangible computer-readable memory device according to claim 17, wherein a rule of said rule set corresponding to said start insertion operation provides adding a corresponding insert operation to the "pending insert" list of insert operations,
wherein when a corresponding insert operation adds a value greater or equal to the maximum in the "definite" heap, said method comprising: modifying each state which includes a corresponding remove operation of that value by adding the insert operation to the "pending insertions" list; and said method creating a further new state including the insert-remove pair in the "associated removal" list.

24. The tangible computer-readable memory device according to claim 17, wherein an end insertion operation includes:
traversing said state set to determine if end insertion value is still in the "pending insertions" list and one of:
if the insert operation is not pending, then the insert operation is a part of an associated pair contained in the associated removes collection and the insert operation is removed from the list if the remove operation; or
if the pending insertions collection includes the insert operation, then removing the insert operation from the pending insertions collection and adding the insert operation to the finished insertions collection.

* * * * *